United States Patent [19]

Hirasawa

[11] Patent Number: 5,517,238
[45] Date of Patent: May 14, 1996

[54] CAMERA WITH IMAGE STABILIZATION CONTROLLED BY FOCUS DETECTION

[75] Inventor: Masahide Hirasawa, Kanagawa, Japan

[73] Assignee: Canon Kabushiki Kaisha, Tokyo, Japan

[21] Appl. No.: 306,582

[22] Filed: Sep. 15, 1994

[30] Foreign Application Priority Data

Sep. 22, 1993 [JP] Japan .................................. 5-236409

[51] Int. Cl.$^6$ .................................................. H04N 5/232
[52] U.S. Cl. .......................... 348/208; 348/352; 354/400
[58] Field of Search ..................................... 348/208, 700, 348/345, 352; 354/430, 400

[56] References Cited

U.S. PATENT DOCUMENTS

| 5,107,293 | 4/1992 | Sekine et al. | 348/208 X |
| 5,170,255 | 12/1992 | Yamada et al. | 348/208 |
| 5,210,563 | 5/1993 | Hamada et al. | 354/400 |
| 5,220,375 | 6/1993 | Ishida et al. | 354/430 X |

*Primary Examiner*—Wendy R. Greening
*Attorney, Agent, or Firm*—Fitzpatrick, Cella, Harper & Scinto

[57] ABSTRACT

A camera includes a vibration detecting sensor for detecting a vibration of the camera, a correcting device for correcting a shake of an image due to the vibration, a focus detecting circuit for detecting a state of focus by using information about the image, and a controlling circuit for controlling the correcting operation of the correcting device according to the state of focus detected by the focus detecting circuit.

21 Claims, 6 Drawing Sheets

CAMERA WITH IMAGE STABILIZATION CONTROLLED BY FOCUS DETECTION

BACKGROUND OF THE INVENTION

1. Field of the Invention

The present invention relates to a camera provided with an image stabilization function.

2. Description of the Related Art

In recent years, the evolution of video apparatus, such as video cameras, is remarkable, and automation and a greater number of functions have been realized in various aspects of the video apparatus, One recent example has been the realization of a video camera provided with an image stabilization device which enables good photography by correcting a shake of an image due to a vibration of the camera. FIG. 1 is a block diagram of one example of a camera provided with an optical image stabilization function.

The example shown in FIG. 1 includes a light deflecting lens (variable angle prism) 101 for optically correcting the displacement of an optical axis and performing an image stabilization operation. The structure of the light deflecting lens 101 is such that, for example, a space surrounded by two flat sheet glasses and a bellows is filled with a liquid essentially consisting of silicone. The light deflecting lens 101 is arranged to perform two-dimensional deflection of light by the respective two sheet glasses being pressed vertically and horizontally by corresponding actuators which will be described later.

The example shown in FIG. 1 also includes an angular-velocity sensor 102 for detecting a vertical vibration, an angular-velocity sensor 103 for detecting a horizontal vibration, an image stabilization control circuit 104 for correcting a shake of an image due to a vibration by controlling the light deflecting lens 101 on the basis of vibration information supplied from the angular-velocity sensors 102 and 103 and varying the direction of refraction of light, a driver 105 for outputting an output for driving the light deflecting lens 101 to vertically deflect light, an actuator 106 for driving the light deflecting lens 101 in accordance with the output of the driver 105, a driver 107 for generating an output for driving the light deflecting lens 101 to horizontally deflect light, an actuator 108 for driving the light deflecting lens 101 in accordance with the output of the driver 107, an apex angle sensor 109 for detecting the amount of vertical deflection of light by the light deflecting lens 101, and an apex angle sensor 110 for detecting the amount of horizontal deflection of light by the light deflecting lens 101.

The example shown in FIG. 1 also includes a focus adjusting lens 111, an image pickup element 112 such as a CCD, an amplifier 113, a high-pass filter 114 for extracting a high-frequency component which varies with the state of focus, from a video signal outputted from the image pickup element 112, a lens control circuit 115 for moving the focus adjusting lens 111 toward an in-focus position, i.e., so that the level of the high-frequency component can reach a maximum, in accordance with the state of the output signal of the high-pass filter 114, a motor driver 116, and an actuator 117.

FIG. 2 is a graph showing the output level of the high-pass filter 114 with respect to the position of the focus adjusting lens 111 in the arrangement shown in FIG. 1. As is known, the output signal level of the high-pass filter 114 has the feature that if the focus adjusting lens 111 is out of focus, the high-pass filter 114 outputs a low-level signal and, if the focus adjusting lens 111 is in focus, the high-pass filter 114 outputs a maximum-level signal. The lens control circuit 115 utilizes such a feature and performs so-called "hill climbing AF" control for driving the focus adjusting lens 111 so as to make the output signal level of the high-pass filter 114 closer to a maximum.

FIG. 3 is a flowchart showing a specific process of the hill climbing AF control. In the flowchart shown in FIG. 3, if the process is started in Step 401, the process waits for arrival of a vertical synchronizing signal in Step 402. This is because, during each vertical synchronizing period, an image signal for one picture can only be obtained from a video signal supplied from the image pickup element 112. If the arrival of the vertical synchronizing signal is confirmed in Step 402, the output signal level of the high-pass filter 114 at that time is, in Step 403, inputted into the lens control circuit 115 as a focus voltage value indicative of the state of focus. In Step 404, on the basis of the inputted focus voltage value (by using a past voltage value as required), the lens control circuit 115 determines whether the focus adjusting lens 111 is currently located in an in-focus position. In the case of a largely out-of-focus state in which the focus adjusting lens 111 is entirely away from the in-focus position, the process proceeds to Step 406 through Step 405. In Step 406, the lens control circuit 115 makes an analysis to detect whether an in-focus point is present on a infinity-distance side or a closest-distance side, and drives the focus adjusting lens 111 to cause it to move at a high speed toward the side detected through the analysis. If it is determined in Step 408 that the focus adjusting lens 111 is not largely out of focus and is present in the vicinity of the in-focus point, the lens control circuit 115 executes the processing of Step 409 to confirm the direction in which the focus adjusting lens 111 is to be driven. In Step 410, the focus adjusting lens 111 is driven at a low speed. The reason why the driving speed of the focus adjusting lens 111 is lowered in the vicinity of the in-focus point is to minimize the amount by which the focus adjusting lens 111 overruns the in-focus point.

If it is determined that the current position of the focus adjusting lens 111 coincides with the in-focus point, i.e., if the result of the decision made in Step 405 is "NO" and the result of the decision made in Step 408 is "NO" and the result of the decision made in Step 411 is "YES", the focus adjusting lens 111 is made to stop in Step 412, and the process returns to Step 402. If it is not determined in Step 411 that the current position of the focus adjusting lens 111 coincides with the in-focus point, this indicates that it may be necessary to again perform a focusing operation because of, for example, the movement of a subject. Accordingly, the process proceeds to Step 413, in which it is determined whether it is necessary to restart driving of the focus adjusting lens 111. If it is necessary to restart driving of the focus adjusting lens 111, i.e., if the result of the decision made in Step 413 is "YES", the processing of Step 414 is executed to confirm the direction in which the focus adjusting lens 111 is to be driven. In Step 415, the lens control circuit 115 selects a driving speed suitable for the restarting. Then, the process returns to Step 402.

Since the image stabilization device and an automatic focus adjusting device are disposed as control systems independent of each other, the image stabilization device continues its image stabilization operation during the above-described focusing operation.

In the above-described related-art example, however, since the light deflecting lens 101 performs the image stabilization operation at all times, if the driving direction of the focus adjusting lens 111 is to be determined when the focus adjusting lens 111 is largely out of focus and the focus voltage value is considerably low, the focus voltage value may vary owing to a periodical, light deflecting action, for a cause other than the movement of the focus adjusting lens 111, so that an erroneous decision may be made as to the driving direction.

During the largely out-of-focus state, since the contour of an image is entirely unsharp, the influence of an unnecessary vibration, such as a vibration of a camera, upon photography is extremely small and the effect of the image stabilization operation is low. In addition, in the case of an image-stabilization camera integrated type video tape recorder, the possibility that a photographer starts photography during the largely out-of-focus state is comparatively low. For these reasons, the execution of the image stabilization operation during the largely out-of-focus state offers many demerits to the processing of the automatic focus adjusting device or the consumption of a power source such as a battery.

SUMMARY OF THE INVENTION

A first object of the present invention which has been made to solve the above-described problems is to realize optimization of an image stabilization function and an automatic focus adjusting function in a camera provided with the image stabilization function.

A second object of the present invention is to prevent malfunction of the image stabilization function and realize highly accurate image stabilization characteristics.

A third object of the present invention is to optimize the operation of the image stabilization function and decrease power consumption.

To achieve the above objects, in accordance with one aspect of the present invention, there is provided a camera provided with an image stabilization device, which camera comprises detecting means for detecting a vibration of the camera, correcting means for correcting a shake of an image due to the vibration, focus detecting means for detecting a state of focus by using information about the image, and controlling means for controlling execution and stop of a correcting operation of the correcting means according to the state of focus detected by the focus detecting means.

In accordance with another aspect of the present invention, there is provided a camera provided with an image stabilization device, which camera comprises vibration detecting means for detecting a vibration of the camera, correcting means for correcting a shake of an image due to the vibration, focus detecting means for detecting a state of focus by using information about the image, and controlling means for varying a characteristic of a correcting operation of the correcting means according to the state of focus detected by the focus detecting means.

In such a camera, if an automatic focus adjusting device determines that the state of focus is a largely out-of-focus state in which an image stabilization effect is small, response performance is lowered to prevent a focus detecting operation from being adversely influenced as well as to reduce power consumption. If the automatic focus adjusting device indicates that the state of focus is an in-focus state or a vicinity of the in-focus point, an image stabilization operation is executed and the response performance is enhanced so that a sufficient image stabilization effect can be obtained. Accordingly, it is possible to realize a good, stable image stabilization operation and focus adjusting operation.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of a camera provided with an image stabilization function according to the present invention will be described below in detail with reference to the accompanying drawings.

Figure 4:
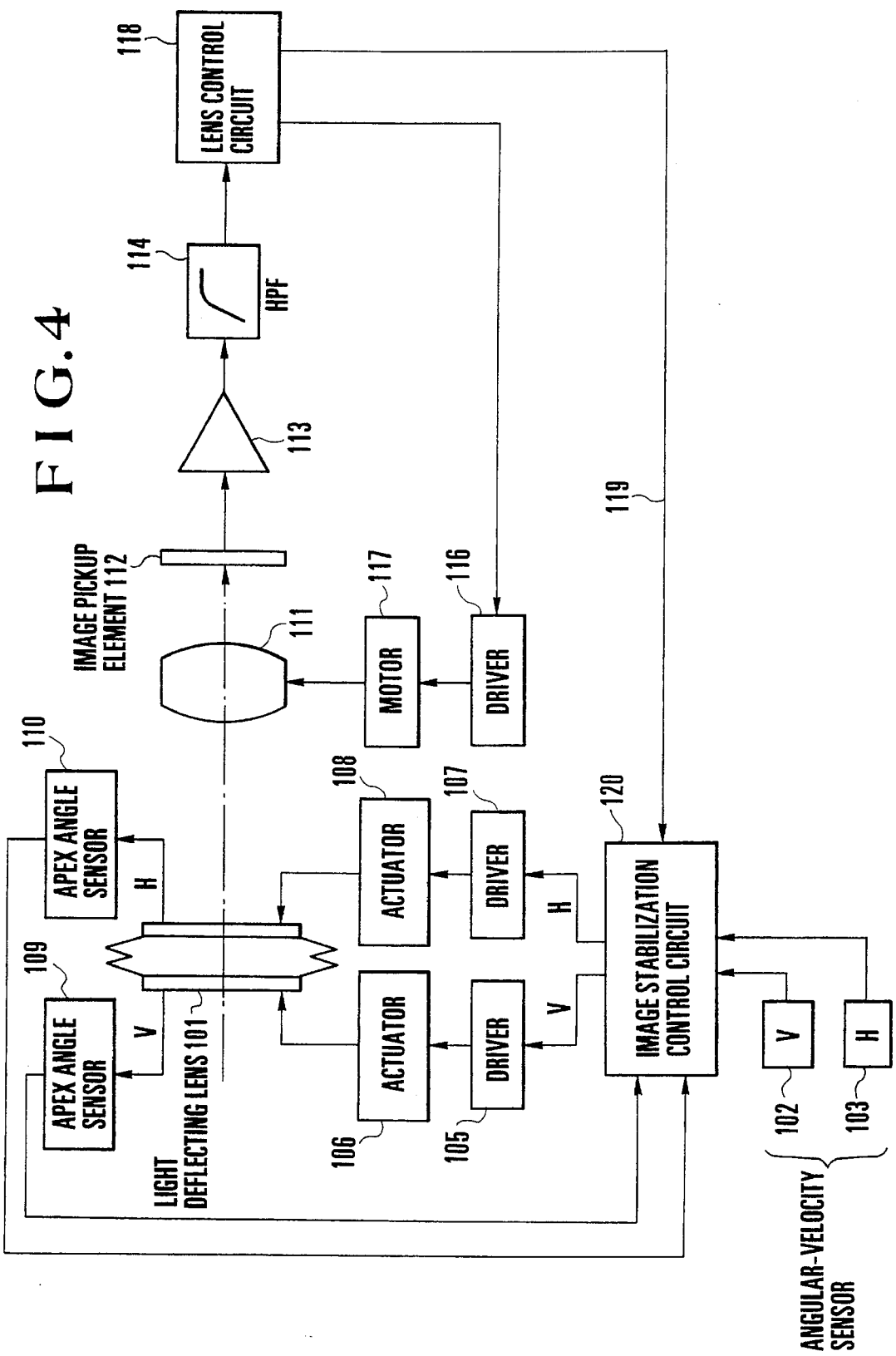
FIG. 4 is a block diagram showing the arrangement of each of first and second embodiments of a camera provided with an image stabilization device according to the present invention.

FIG. 4 is a block diagram showing the arrangement of each of first and second embodiments of the camera according to the present invention. In FIG. 4, identical reference numerals are used to denote constituent parts identical to those shown in the block diagram of FIG. 1, and description further thereof is omitted.

The arrangement shown in FIG. 4 includes a lens control circuit 118 for performing an automatic focus adjusting operation, an image stabilization control circuit 120, and a communication path 119 through which the lens control circuit 118 can output an instruction to execute or stop an image stabilization operation to the image stabilization control circuit 120.

Figure 3:
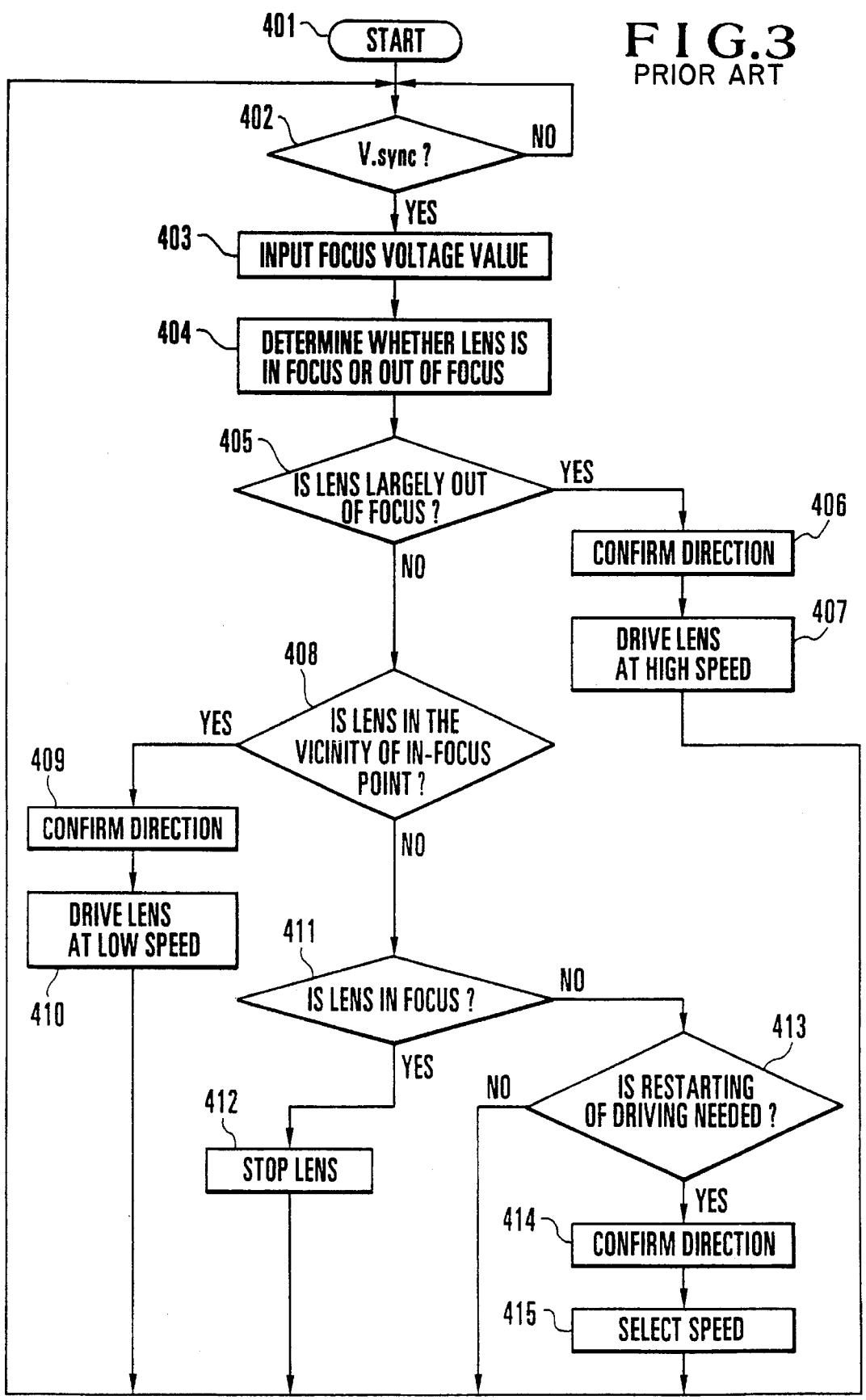
FIG. 3 is a flowchart showing a focus adjusting process.

The lens control circuit 118 has a processing program for automatic focus adjustment which is basically similar to that described previously with reference to the flowchart shown in FIG. 3. However, the processing program includes, in addition to the steps shown in FIG. 3, the steps of outputting through the communication path 119 an instruction signal to control (execute or stop) an image stabilization operation according to the state of focus.

Figure 1:
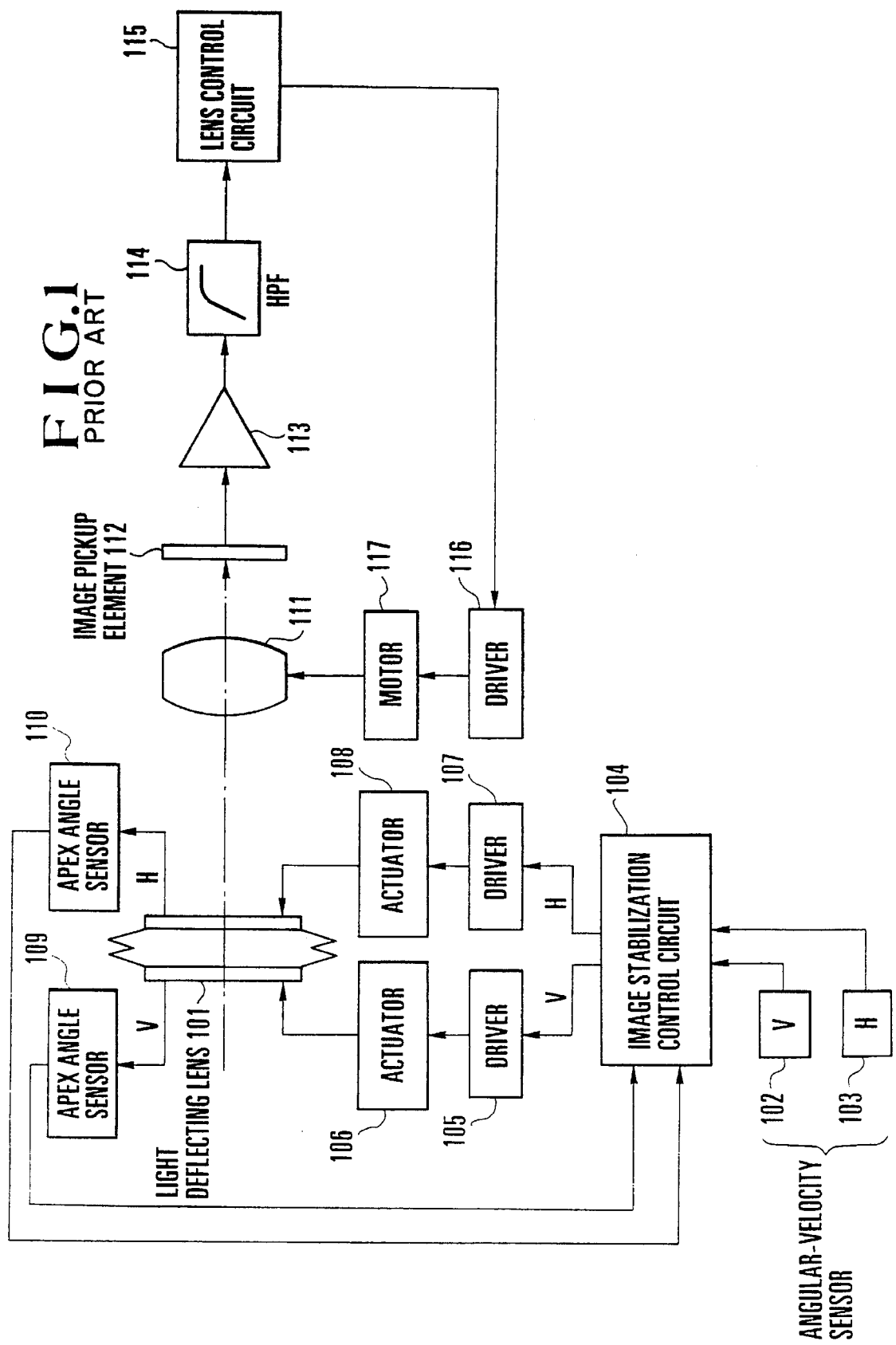
FIG. 1 is a block diagram showing one example of a camera provided with a general image stabilization device.
Figure 2:
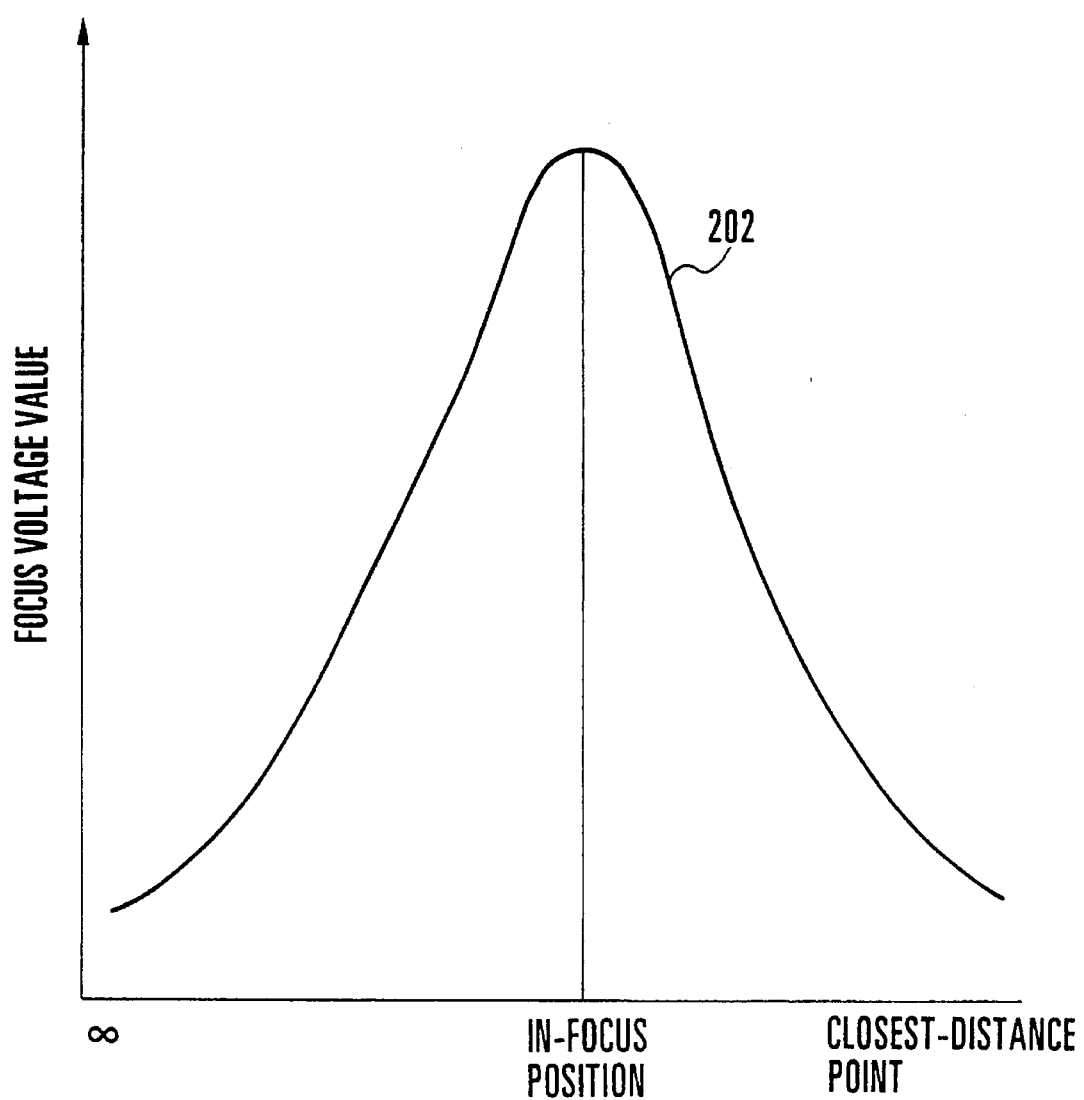
FIG. 2 is a characteristic chart showing the relationship between the position of a focus adjusting lens and a focus voltage value.

The operation of the image stabilization control circuit 120 is similar to the image stabilization operation of the image stabilization control circuit 104 of FIG. 1. However, the image stabilization control circuit 120 includes, in addition to the arrangement of the image stabilization control circuit 104, an arrangement for controlling (executing or stopping) an image stabilization operation according to an instruction signal outputted from the lens control circuit 118 to the image stabilization control circuit 120 through the communication path 119.

Figure 5:
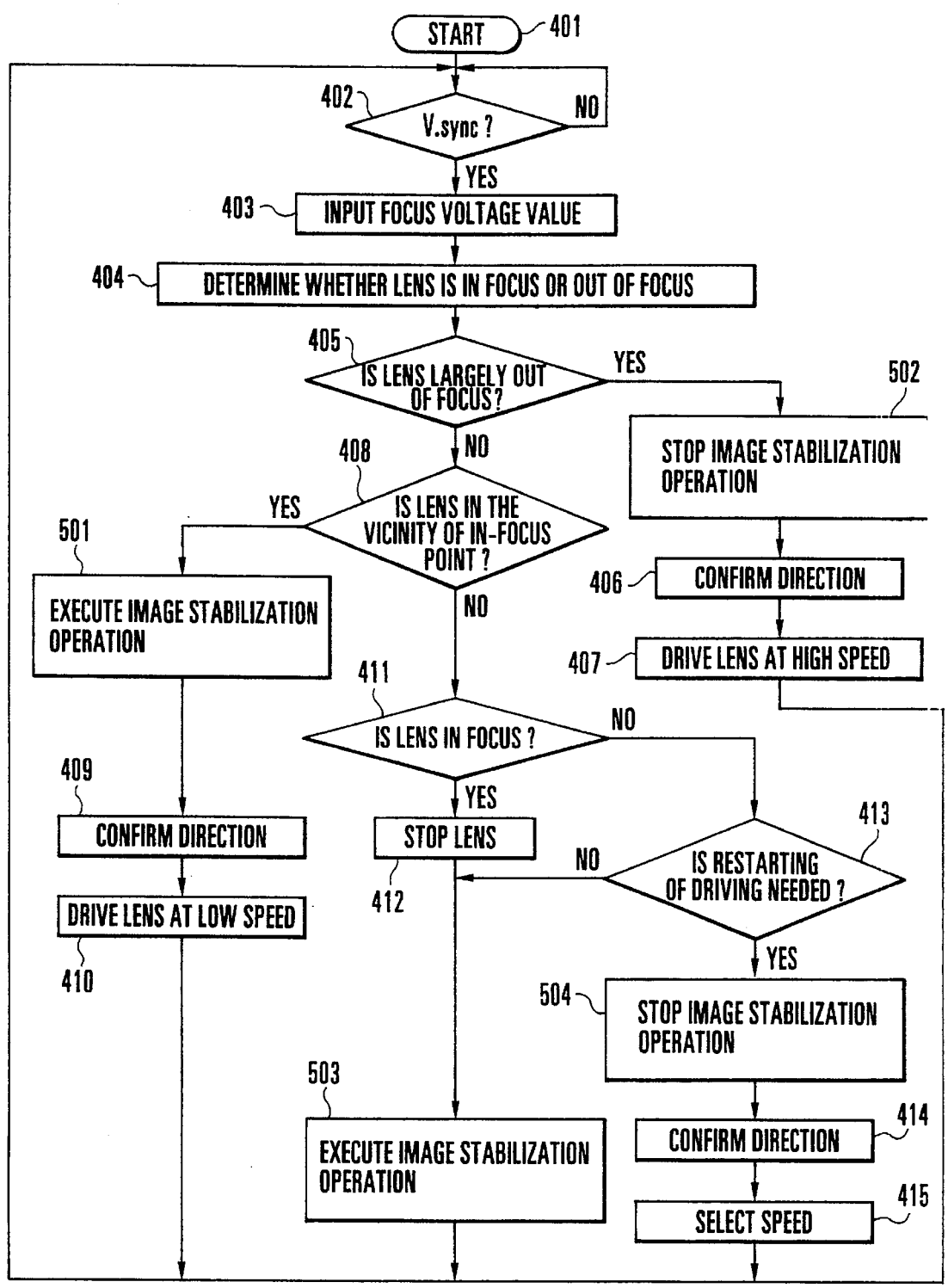
FIG. 5 is a flowchart showing the processing operation of the first embodiment of the camera provided with the image stabilization device according to the present invention.

FIG. 5 is a flowchart showing a control operation according to the first embodiment. In FIG. 5, identical reference numerals are used to denote the steps of executing processings identical to those executed in the corresponding steps of the flowchart of FIG. 3, and description thereof is omitted.

The flowchart of FIG. 5 differs from that of FIG. 3 in that the image stabilization operation is controlled (executed or stopped) according to the state of focus during the execution of the processing of automatic focus adjusting control.

Specifically, if it is determined in Step 405 that the focus adjusting lens 111 is largely out of focus, the processing of Step 502 is executed so that the lens control circuit 118 communicates an instruction to stop an image stabilization operation to the image stabilization control circuit 120 through the communication path 119, thereby stopping the image stabilization operation. This is because, in the case of such a largely out-of-focus state, a focus voltage value is expected to be considerably low as described previously so that if the light deflecting lens 101 is driven to perform an image stabilization operation, the focus voltage value varies owing to a periodical, light deflecting action and the lens control circuit 118 may erroneously determine the direction in which the light deflecting lens 101 is to be driven. This is also because, in the case of the largely out-of-focus state, the contour of an image is unsharp and an unnecessary vibration, such as a vibration of the camera, does not exert a large influence on the image so that the image stabilization effect is low. In the processing of Step 502, it is also possible to prevent unnecessary power consumption.

If it is not determined in Step 405 that the focus adjusting lens 111 is largely out of focus and it is determined in Step 408 that the focus adjusting lens 111 is located in the vicinity of an in-focus point, this indicates that the contour of the photographed image is considerably sharp and a remarkable, image stabilization effect can be visually confirmed in an image plane. Accordingly, the process proceeds to Step 501, in which the lens control circuit 118 communicates an instruction to execute an image stabilization operation to the image stabilization control circuit 120 through the communication path 119, thereby causing the image stabilization control circuit 120 to execute the image stabilization operation.

If it is not determined in Step 408 that the focus adjusting lens 111 is located in the vicinity of the in-focus point and it is determined in Step 412 that the focus adjusting lens 111 is placed in an in-focus state, the process proceeds to Step 412, in which the focus adjusting lens 111 is made to stop. To obtain a good, photographic image by preventing a shake of the image due to, for example, a vibration of the camera, the processing of Step 503 is executed so that the lens control circuit 118 communicates an instruction to execute an image stabilization operation to the image stabilization control circuit 120 through the communication path 119, thereby causing the image stabilization control circuit 120 to execute the image stabilization operation.

As described above, if it is not determined in Step 408 that the focus adjusting lens 111 is located in the vicinity of the in-focus point and it is determined in Step 411 that the focus adjusting lens 111 is placed in the in-focus state, the process proceeds to Step 412, in which the focus adjusting lens 111 is made to stop. After the focus adjusting lens 111 has been made to stop, if it is determined in Step 411 that the focus adjusting lens 111 has gone out of the in-focus state, the process proceeds to Step 413, in which it is determined whether it is necessary to perform the operation of restarting the driving of the focus adjusting lens 111. The decision as to whether the restarting is needed can be made by making a comparison between a focus voltage value at which it has been determined that the focus adjusting lens 111 is in focus and the current voltage value.

Specifically, in Step 413, if the difference between the focus voltage value at which it has been determined that the focus adjusting lens 111 is in focus and the current focus voltage value is lower than a predetermined threshold, it is determined that the focus adjusting lens 111 has gone out of the in-focus state, and a focus adjusting operation (the driving of the focus adjusting lens 111) is restarted. If the focus adjusting operation is to be restarted, it is necessary to eliminate an unnecessary variation in the focus voltage value so that the direction in which the focus adjusting lens 111 is to be driven can be determined or the degree of defocus can be confirmed to set an accurate driving speed of the focus adjusting lens 111. For this reason, if it is determined in Step 413 that it is necessary to restart the focus adjusting operation, the processing of Step 504 is executed so that the lens control circuit 118 communicates an instruction to stop the image stabilization operation to the image stabilization control circuit 120 through the communication path 119, thereby stopping the image stabilization operation.

If it is not determined in Step 413 that it is necessary to restart the focus adjusting operation, this indicates that the focus adjusting lens 111 is held in the in-focus state. Accordingly, the processing of Step 503 is executed so that the lens control circuit 118 communicates an instruction to execute an image stabilization operation to the image stabilization control circuit 120 through the communication path 119, thereby causing the image stabilization control circuit 120 to execute the image stabilization operation.

By performing the above-described process, it is possible to prevent wasteful power consumption by stopping the image stabilization operation during the largely out-of-focus state in which no image stabilization effect can be obtained, and it is also possible to realize a focus adjusting operation free of malfunction by preventing an unnecessary variation in the focus voltage value during the restarting. Further, if the focus adjusting lens is in focus or in the vicinity of an in-focus point at which the contour of an image is sharp and a remarkable, image stabilization effect can be visually confirmed in the image plane, the image stabilization operation is executed so that it is possible to prevent a degradation of the image due to, for example, a vibration of the camera, or a malfunction of a focus adjusting device. Accordingly, it is possible to perform an efficient image stabilization operation according to the state of focus so that it is possible to consistently perform a good, photographic operation.

The second embodiment of the present invention will be described below.

Although, in the first embodiment, the operation of the image stabilization device is controlled (executed or stopped) according to the state of focus, the second embodiment is intended to realize a smoother operation control not by merely turning on or off the image stabilization device but by varying the response performance and operating characteristics of the image stabilization device. Specifically, the second embodiment can be used in the case of a largely out-of-focus state in which it is desired to obtain an image stabilization effect by causing a light deflecting lens to perform a certain extent of light deflecting operation.

Figure 6:
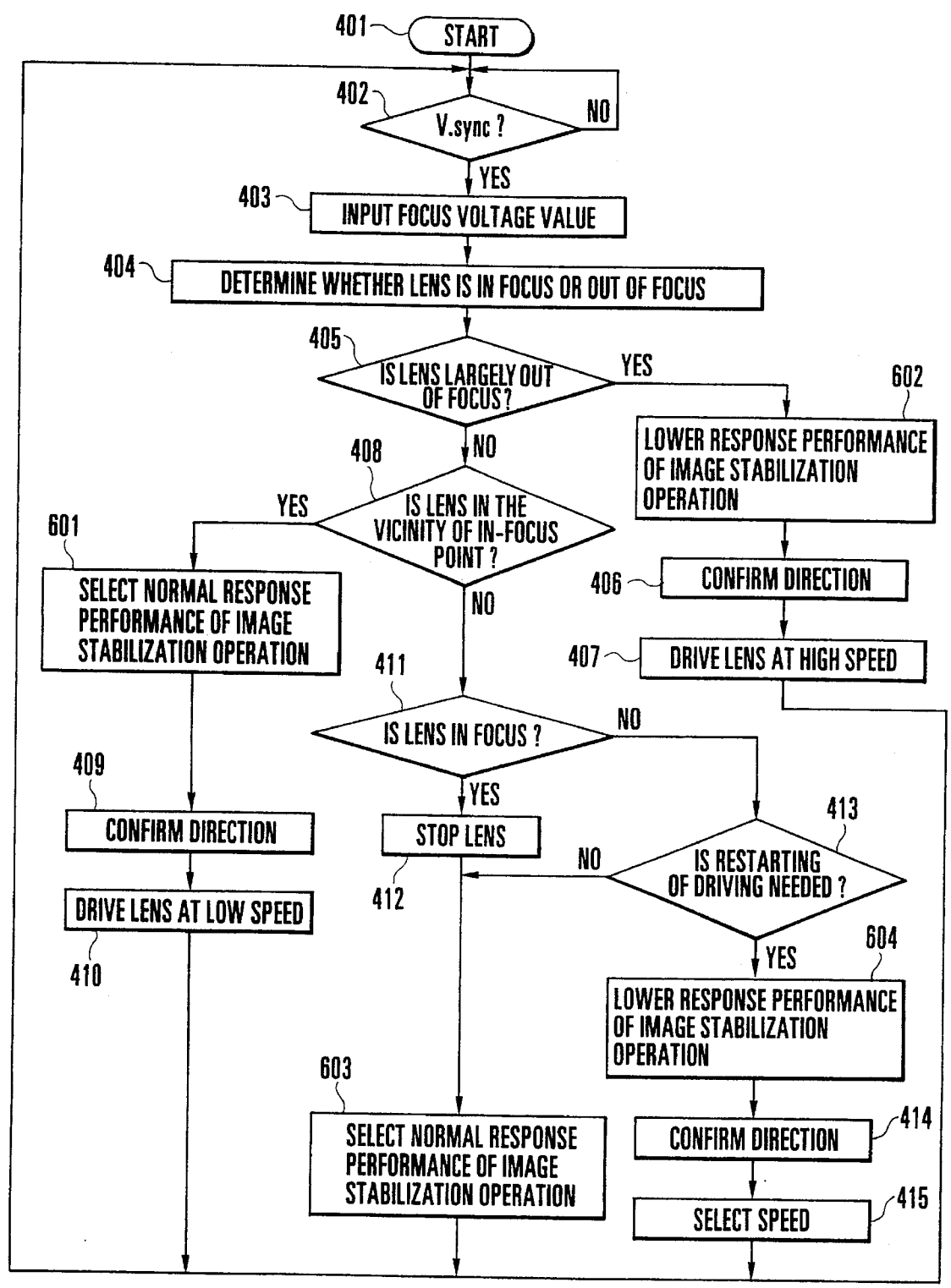
FIG. 6 is a flowchart showing the processing operation of the second embodiment of the camera provided with the image stabilization device according to the present invention.

The arrangement of the second embodiment is similar to that of the first embodiment shown in FIG. 4, and further description thereof is omitted. The second embodiment differs from the first embodiment in respect of the processing of the instruction outputted from the lens control circuit 118 to the image stabilization control circuit 120. FIG. 6 is a flowchart showing a process to be executed by the lens control circuit 118.

The second embodiment is arranged to vary the response performance of the image stabilization operation of the aforesaid image stabilization device. If the image stabilization effect is low, the response performance of the image stabilization operation of the image stabilization device is made low, whereas if a sufficient image stabilization effect is obtained, the response performance is set to its normal state. To switch the response performance between the low state and the normal state, it is preferable to use, for example, a loop gain which is switchable between two levels. In this case, during the normal state, the loop gain is kept high to enhance the response performance, whereas, during the low state in which the image stabilization effect is low, the loop gain is kept low to lower the response performance. With such loop gain, it is possible to obtain a certain extent of image stabilization operation even in the case of a largely out-of-focus state, and it is possible to realize a good, photographic operation as a whole without adversely affecting the operation of the automatic focus adjusting device during the largely out-of-focus state.

Referring to FIG. 6, if the focus adjusting lens 111 is located in the vicinity of the in-focus point (Step 408), the process proceeds to Step 601, in which the response performance of the image stabilization operation is set to the normal state. Similarly, if the focus adjusting lens 111 is in focus (Step 411), the response performance of the image stabilization operation is set to the normal state in Step 603. Thus, in either of the steps 601 or 603, it is possible to obtain a sufficient image stabilization performance.

If the focus adjusting lens 111 is largely out of focus (Step 405), the process proceeds to Step 602, in which the response performance of the light deflecting operation of the light deflecting lens 101 for performing the image stabilization operation is made low. Similarly, if a decision is to be made as to the direction in which the focus adjusting lens 111 is to be driven for restarting purpose (Step 414), the response performance of the light deflecting operation of the light deflecting lens 101 for performing the image stabilization operation is made low in Step 604. Thus, in either of the steps 602 or 604, it is possible to obtain a certain extent of image stabilization operation while preventing the automatic focus adjusting system from being adversely affected.

In the description of the first embodiment, reference has been made to the arrangement in which the lens control circuit 118 controls the image stabilization control circuit 120 so that the image stabilization operation can be executed or stopped. In the description of the second embodiment, reference has been made to the arrangement in which the lens control circuit 118 controls the image stabilization control circuit 120 so that the response performance can be kept normal or made low. However, if the focus decision described in connection with the flowchart of each of FIGS. 5 and 6 is made up of a greater number of fine steps or if it is desired to prepare far finer control modes, it is also possible to suitably combine the above-described contents of the first and second embodiments so that the image stabilization operation can be formed by a plurality of steps each corresponding to a predetermined amount of image stabilization and the response performance can vary step by step between the stopped and normal states of the image stabilization operation. Such an arrangement can also be encompassed in the scope of the present invention without departing from the gist thereof.

Although each of the first and second embodiments has been described with reference to the camera having optical image stabilization means, problems similar to those described previously are also present in an arrangement in which a video signal subjected to electronic image stabilization processing is used for focus adjustment. However, whichever of optical image stabilization and electronic image stabilization may be adopted, it is possible to achieve similar effects by stopping or executing the image stabilization operation according to the degree of defocus or by adjusting the amount of the image stabilization operation. Accordingly, the present invention can be directly applied to a camera having electronic image stabilization means.

As is apparent from the foregoing description, according to either of the first and second embodiments, in an apparatus arranged to perform automatic focus adjustment while referring to an image modified by an optical image stabilization device, it is possible to accurately determine the direction or degree of defocus even in the case of a low focus voltage value by the provision of means for stopping a light deflecting operation during a largely out-of-focus state or the like and executing the light deflecting operation when a focus adjusting lens is located at an in-focus point or in the vicinity of the in-focus point. Since no large image stabilization effect can be visually observed during the largely out-of-focus state or the like, even if the image stabilization operation is stopped, no performance is influenced so that it is possible to prevent wasteful battery consumption.

What is claimed is:

1. A camera comprising:

image pickup means;

vibration detecting means for physically detecting a vibration of a camera body;

correcting means for correcting a motion of an image due to the vibration on the basis of information about the vibration detected by said vibration detecting means;

focus detecting means for detecting a state of focus on the basis of a predetermined signal component of an image signal output by said image pickup means; and controlling means for controlling a correcting operation of said correcting means according to the state of focus detected by said focus detecting means to prevent an erroneous focal adjustment by said focus detecting means.

2. A camera according to claim 1, wherein said controlling means controls execution and restrains the correcting operation of said correcting means according to the state of focus detected by said focus detecting means.

3. A camera according to claim 2, wherein said controlling means stops the correcting operation of said correcting means when the state of focus is a largely out-of-focus state.

4. A camera according to claim 1, wherein said vibration detecting means comprises an angular-velocity sensor.

5. A camera according to claim 1, wherein said correcting means comprises a variable angle prism.

6. A camera according to claim 1, wherein said focus detecting means detects the state of focus on the basis of a level of a high-frequency component of a picked-up image signal.

7. A camera comprising:

image pickup means;

vibration detecting means for detecting a vibration of a camera body;

correcting means for optically correcting a motion of an image due to the vibration on the basis of information about the vibration detected by said vibration detecting means;

focus detecting means for detecting a state of focus on the basis of a predetermined signal component of an image signal output by said image pickup means; and controlling means for controlling a characteristic of a correcting operation of said correcting means according to the state of focus detected by said focus detecting means to prevent an erroneous focal adjustment by said focus detecting means.

8. A camera according to claim 7, wherein said controlling means controls a response characteristic of a vibration correcting operation of said correcting means according to the state of focus detected by said focus detecting means.

9. A camera according to claim 8, wherein said controlling means controls an amount of correction to be executed by said correcting means, by varying a control loop gain of said correcting means according to the state of focus detected by said focus detecting means.

10. A camera according to claim 9, wherein said controlling means lowers the loop gain of said correcting means when the state of focus is a largely out-of-focus state.

11. A camera according to claim 7, wherein said vibration detecting means comprises an angular-velocity sensor.

12. A camera according to claim 7, wherein said correcting means comprises a variable angle prism.

13. A camera according to claim 7, wherein said focus detecting means detects the state of focus on the basis of a level of a high-frequency component of a picked-up image signal.

14. A video camera comprising:

image pickup means;

shake detecting means for detecting a shake;

correcting means for optically correcting a motion of an image due to the shake on the basis of information about the shake detected by said shake detecting means;

focus detecting means for detecting a state of focus on the basis of a predetermined signal component of an image signal output from said image pickup means; and controlling means for controlling a correcting operation of said correcting means according to the state of focus detected by said focus detecting means to prevent an erroneous focal adjustment by said focus detecting means.

15. A video camera according to claim 14, wherein said controlling means controls execution and stop of the correcting operation of said correcting means according to the state of focus detected by said focus detecting means.

16. A video camera according to claim 15, wherein said controlling means stops the correcting operation of said correcting means when the state of focus is a largely out-of-focus state.

17. A video camera according to claim 14, wherein said controlling means controls a response characteristic of the correcting operation of said correcting means according to the state of focus detected by said focus detecting means.

18. A video camera according to claim 17, wherein said controlling means controls an amount of correction to be executed by said correcting means, by varying a control loop gain of said correcting means according to the state of focus detected by said focus detecting means.

19. A video camera according to claim 18, wherein said controlling means lowers the loop gain of said correcting means when the state of focus is a largely out-of-focus state.

20. A video camera according to claim 14, wherein said vibration detecting means comprises an angular-velocity sensor.

21. A video camera according to claim 14, wherein said correcting means comprises a variable angle prism.

* * * * *

UNITED STATES PATENT AND TRADEMARK OFFICE
CERTIFICATE OF CORRECTION

PATENT NO. : 5,517,238
DATED : May 14, 1996
INVENTOR(S) : Hirasawa

It is certified that error appears in the above-indentified patent and that said Letters Patent is hereby corrected as shown below:

<u>Column 1</u>,

Line 11, "is" should read --has been--; and
   Line 13, "apparatus," should read --apparatus.--.

<u>Column 4</u>,

Line 40, "description" should read --further description--; and
   Line 41, "further" should be deleted.

Signed and Sealed this

Tenth Day of September, 1996

Attest:

BRUCE LEHMAN

*Attesting Officer*    *Commissioner of Patents and Trademarks*